(12) United States Patent
Ittycheriah et al.

(10) Patent No.: US 7,100,000 B1
(45) Date of Patent: Aug. 29, 2006

(54) SYSTEM AND METHODS FOR PROCESSING AUDIO USING MULTIPLE SPEECH TECHNOLOGIES

(75) Inventors: Abraham P. Ittycheriah, Danbury, CT (US); Stephane H. Maes, Danbury, CT (US); Jan Sedivy, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/505,807

(22) Filed: Feb. 17, 2000

Related U.S. Application Data (60) Provisional application No. 60/136,671, filed on May 28, 1999.

(51) Int. Cl.
*H04M 11/00* (2006.01)
*G06F 12/14* (2006.01)

(52) U.S. Cl. .................... 711/147; 379/88.16
(58) Field of Classification Search ............ 379/67.1, 379/70, 71, 88.16, 88.22, 88.23, 88.27; 710/52–58; 709/230, 231, 200–204, 207, 212–216, 310, 709/312, 318; 711/147, 150
See application file for complete search history.

(56) References Cited

U.S. PATENT DOCUMENTS

| | | | | |
|---|---|---|---|---|
| 4,841,574 A | * | 6/1989 | Pham et al. ................. 704/201 |
| 4,916,658 A | * | 4/1990 | Lee et al. .................... 711/100 |
| 5,029,200 A | * | 7/1991 | Haas et al. ............... 379/88.18 |
| 5,581,600 A | * | 12/1996 | Watts et al. ............. 379/88.02 |
| 5,867,734 A | * | 2/1999 | Drews .......................... 710/52 |
| 5,873,089 A | * | 2/1999 | Regache ..................... 707/100 |
| 5,928,330 A | * | 7/1999 | Goetz et al. ................ 709/231 |
| 6,018,766 A | * | 1/2000 | Samuel et al. ............. 709/218 |
| 6,032,117 A | * | 2/2000 | Tsuiki et al. ................ 704/258 |
| 6,038,592 A | * | 3/2000 | Verplanken et al. ........ 709/215 |
| 6,237,047 B1 | * | 5/2001 | Peebles et al. ................. 710/5 |
| 6,519,686 B1 | * | 2/2003 | Woodring et al. .......... 711/147 |

* cited by examiner

*Primary Examiner*—Fan Tsang
*Assistant Examiner*—Joseph T Phan
(74) *Attorney, Agent, or Firm*—F. Chau & Associates LLC; Frank V. DeRosa (57) ABSTRACT

An audio splitting system for sharing speech data associated with the same utterance between multiple speech technologies (consumers). In one aspect, the system comprises one or more queues for storing data, a plurality of consumers each sharing the data stored in the one or more queues and a scheduler for managing the storage of the data in the one or more queues and the consumption of the data in the one or more queues by each of the plurality of consumers. The consumers will register their data requirements and priority requests with the scheduler. The scheduler assigns each of the plurality of consumers to one or more of the queues based on the registered data requirements.

4 Claims, 6 Drawing Sheets

SYSTEM AND METHODS FOR PROCESSING AUDIO USING MULTIPLE SPEECH TECHNOLOGIES

CROSS-REFERENCE TO RELATED APPLICATION

This application is based on provisional application U.S. Ser. No. 60/136,671 filed on May 28, 1999.

BACKGROUND

1. Technical Field

The present invention relates generally to data processing systems and, more particularly, to systems and methods for providing managed sharing of audio data between multiple speech technologies.

2. Description of Related Art

Currently, there are many speech/audio processing systems in which audio data or processed speech data is stored in buffers for consumption and further processing by speech engines. The conventional systems, however, typically do not include mechanism for properly balancing the load on engines and managing the consumption of data from the buffers. For instance, in the area of telephony DSP (digital signal processing) cards, conventional systems include a hardware based TDM (time-division multiplexed) bus which carries speech data to single or multiple destinations. This architecture requires the use of dedicated chips to transport the signal as well as physical cards. These systems do not provide intelligent routing of the speech stream which may cause the speech stream to be transmitted twice to the same host.

In addition, in the area of embedded architectures, the currently existing systems have very limited capabilities. For example, these embedded systems typically operate by having an audio subsystem assigned temporarily to a specific conversational engine until the audio subsystem is released either by the engine, the controlling application or the underlying operating system.

Furthermore, conventional sound card systems, in general, capture an audio waveform and store the waveform in digitized form in a buffer. Typically, these systems are configured such that only one application will be consuming the content of the buffer at a given time. In specific cases, however, where an utterance is shared between different engines one of the following methods may be used. One method includes a hardware implementation of multiple parallel buffers on the sound card to which multiple engines could connect. Although such soundcard configuration is not commercially available at the present time, a hardware implementation would require adding the necessary circuitry to route the data stream to the aforementioned buffers. Such a system would not provide intelligent management of the consumption or tailoring of the systems resources according to the evolution of the speech sharing. With another method, a single buffer through one engine may be used which thereafter saves the utterance in a logged file for consumption by the other engines. These engines receive the file name and path information as handle to the data. Again, intelligent management of the data consumption in such an architecture is nonexistent.

Furthermore, with systems that generate output speech (playback or output from TTS), the output is typically sent to an output buffer that is consumed by a D/A converter of the audio subsystem. Such an approach typically does not provide management the output consumption, especially in conjunction with the input resource requirements when operating in a full duplex mode.

Accordingly, a system and method that provides intelligent routing and sharing of speech data for consumption by multiple engines operating in a given speech system is highly desirable.

SUMMARY OF THE INVENTION

The present invention is directed to system and methods for sharing speech data associated with the same utterance between multiple speech technologies. In one aspect of the present invention, a system for sharing data between multiple consumers (or data splitting system) comprises a first queue for storing data; a plurality of consumers each sharing the data stored in the first queue; and a scheduler for managing the storage of the data in the first queue and the consumption of the data in the first queue by each of the plurality of consumers.

In another aspect of the present invention, the system comprises a plurality of queues and plurality of consumers. The consumers may include speech engines such as feature extraction engines, speech decoding engines, and speaker identification/verification engines, as well as data compression and decompression engines. The consumers will register their data requirements and priority requests with the scheduler. The scheduler assigns each of the plurality of consumers to one or more of the plurality of queues based on the registered data requirements. In this manner, the sharing of audio data (i.e., audio splitting) can occur at different stages in an I/O processing chain by, e.g., distributing digitized waveforms between different consuming engines and distributing features obtained at several stages of processing of the audio stream.

In yet another aspect, for each queue in the system, the scheduler maintains an IN pointer associated with the data source that feeds the queue and one OUT pointer for each of the plurality of consumers assigned to the queue, so as to manage the flow of the data in and out of the queue. Using these pointers, the scheduler can determine how much of the shared data has been read/not read by each of the consumers. The scheduler will prioritize data consumption of the queue based on an amount of unread data of each of the of consumers assigned to the queue.

The present invention may be implemented on various platforms. For instance, in one embodiment, an audio splitting system according to the present invention may be implemented in an embedded engine. In another embodiment, an audio splitting system may be implemented in a telephony system. In yet another embodiment, an audio splitting system may be implemented in an audio playback/processing system.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the exemplary system and methods described herein may be implemented in various forms of hardware, software, firmware, special purpose processors, or a combination thereof. Preferably, the present invention is implemented in software as an application program tangibly embodied on a program storage device. The application program may be executed by any machine, device or platform comprising suitable architecture. It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
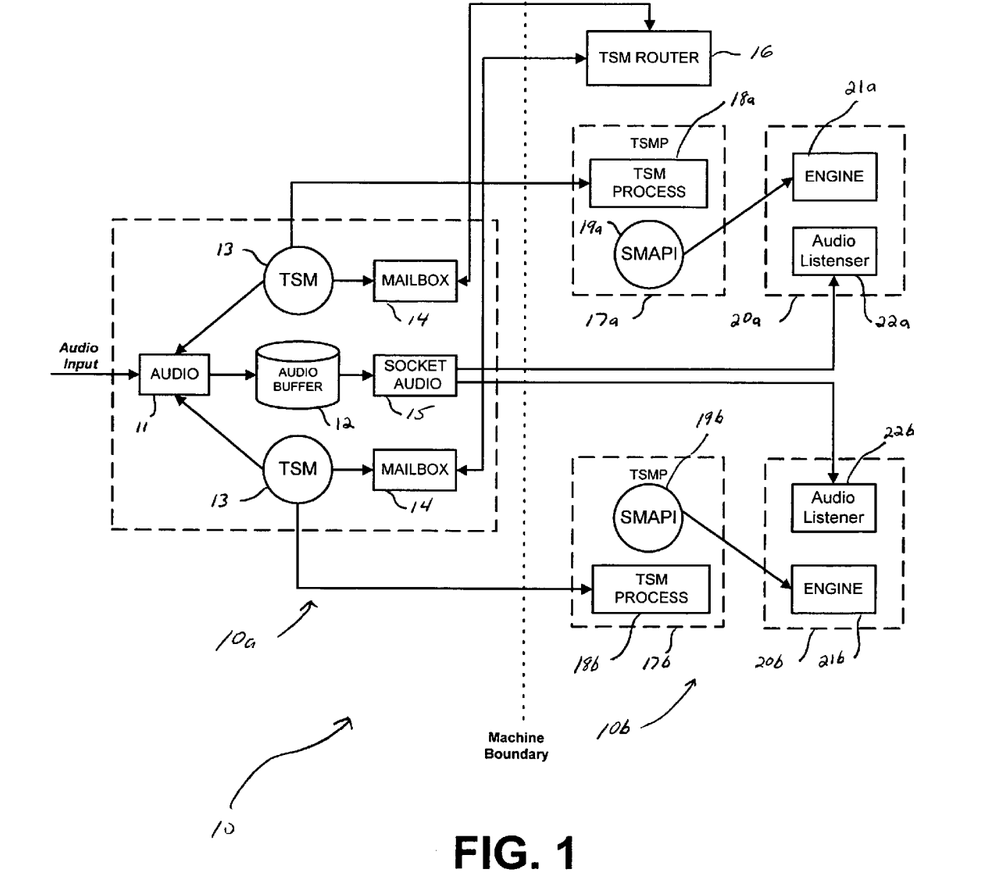
FIG. 1 is a block diagram of a system for processing audio data using multiple speech technologies according to one embodiment of the present invention.

Referring now to FIG. 1, a block diagram illustrates a system for supporting multiple speech processing technologies according to an embodiment of the present invention. In particular, the system of FIG. 1 illustrates a telephony system 10 according to an exemplary embodiment of the invention (which is preferably implemented on a computer platform) for providing one or more telephony services. The telephony system 10 comprises a speech splitting subsystem 10a and a speech processing subsystem 10b having a plurality of engines for processing the audio data so as to provide a variety of speech services (e.g., speech recognition, speaker identification, etc.) In general, the speech splitting subsystem 10a is configured for duplicating an audio data stream (e.g., speech data) and allocating each of the duplicated audio streams to a corresponding engine in the speech processing subsystem 10b based on the particular speech services that are requested from, e.g., an application that is currently managing the telephone line. For example, if the application is a banking application, a request may be for a speech recognizer to recognize an account number and another request may be made for a speaker verification engine to verify the speaker that is using the account number. More specifically, the systems and methods disclosed in U.S. Pat. No. 5,897,616, issued on Apr. 27, 1999 to Kanevsky et al., entitled "Apparatus and Methods For Speaker Verification/Identification/Classification Employing Non-Acoustic and/or Acoustic Models and Databases" and U.S. Ser. No. 08/788,471, filed on Jan. 28, 1997, entitled "Text Independent Speaker Recognition for Transparent Command Ambiguity Resolution And Continuous Access Control," are typical applications where the present invention may be employed.

The telephony system 10 comprises a telephone card (not shown) to monitor a telephone line and detect and answer and incoming call. When an incoming call is answered, the telephony system 10 will record the incoming audio data (e.g., speech data) via audio module 11 and store the recorded audio in audio buffer 12. The audio module 11 is the portion of the application that is responsible for capturing and converting (and possible processing) the speech and transmitting the speech data to single or multiple destinations.

The audio splitting subsystem 10a comprises one or more telephony speech managers (TSM) 13 (i.e., control points) which share a single recorded audio stream. Each TSM object 13 is preferably defined as a class to provide a specific API (application program interface) for accessing certain telephony services. In particular, each TSM object 13 serves as an API to a corresponding TSM processing subsystem (TSMP) 17a and 17b of the speech processing system 10a. Each TSM object 13 is the control side (client) for making requests to a specific technology or speech engine based on the requests for particular speech services from the managing application. In particular, each TSM object 13 will make requests to the Audio object 11 in response to particular requests from the managing application for transmitting speech data to a particular speech processing engine.

Each TSMP 17a and 17b of the speech processing subsystem 10b comprises a TSM process 18a and 18b, respectively. Each TSM process 18a and 18b acts as a "server" to process requests from corresponding TSM objects 13 on the client side TSM (e.g., to enable a vocabulary). In addition, each TSMP 17a and 17b comprises a SMAPI (speech manager application program interface) 19a and 19b (or any other conventional API that is suitable for the given application) which provides low-level interfaces to corresponding engines 21a and 21b in engine subsystems 20a and 20b.

The audio splitting subsystem 10a further comprises a mailbox module 14 connected to each TSM object 13. Each mailbox module 14 serves as a communication mechanism for the client and operates to find a particular engine requested by the client. More specifically, each mailbox module 14 may query a TSM router 16 to determine if there is a TSMP 17a and 17b associated with an engine 21a and 21b that is responsible for performing the requested speech processing function (e.g., speech recognition, speaker identification etc.). It is to be understood that other suitable communication mechanisms and protocols (other than mail boxes) may be employed herein. The TSM Router process 16 maintains a list of servers that it owns in a table. The table also indicates the state of the engines, e.g., whether particular engines are allocated or free. When a request is received from a client side TSM object 13, the TSM Router 16 will scan its table to located the desired engine type. If a requested engine is found, the TSM Router 16 will deliver a handle to that engine (i.e., the TSM router 16 returns the handle of the TSMP (e.g., 17a and 17b) that is responsible for performing the requested function). The appropriate connection will then automatically be established to the server via, e.g., RPC (remote procedure call), sockets, windows messages, etc. The engine is then marked "busy" and is then freed by the TSM client side object 13 after the speech function is complete.

A socket audio module 15 (or "audio splitter" module) is configured for duplicating the speech and transmitting the speech in real time to each engine subsystem 20a and 20b which are allocated for performing the requested speech services. Particularly, the socket audio module 15 utilizes any suitable standardized protocol such as TCP/IP (transmission control protocol/internet protocol), RTP (realtime protocol), Voice over IP, or other streaming protocols, for transmitting the duplicated speech data to the desired engine subsystems 20a and 20b. Each engine subsystem 20a and 20b comprises an audio listener module 22a and 22b, respectively, which listens on, e.g., an TCP/IP socket to receive transmitted speech data having a corresponding protocol address.

It is to be appreciated that because a common protocol is utilized (i.e., all the recipients agree to accept a common format), the format of the transmitted speech data can be unconstrained. In addition, to reduce the network bandwidth and reduce the processing at each recipient, the duplicated data streams can be preprocessed (e.g., pre-emphasis, filtering, acoustic feature extraction, labeling, etc.).

It is to be understood that the speech splitting subsystem 10a may be network-connected to the speech processing subsystem 10b for providing remote speech processing services, wherein each engine is located on a single computer or server or multiple computers or servers. In addition, the entire speech processing subsystem 10b may reside on a single computer or server along with the speech splitting subsystem 10a. It is to be appreciated that if the plurality of engines 21a and 21b reside on a common host, then only a single connection need be made to the remote host so as to ship the audio data once using only the minimal network bandwidth required. In this manner, a proxy process can be included on the second host whereby, instead of directly talking to the engines, the telephony system can talk to the proxy which would then duplicate the stream on the host.

Figure 2:
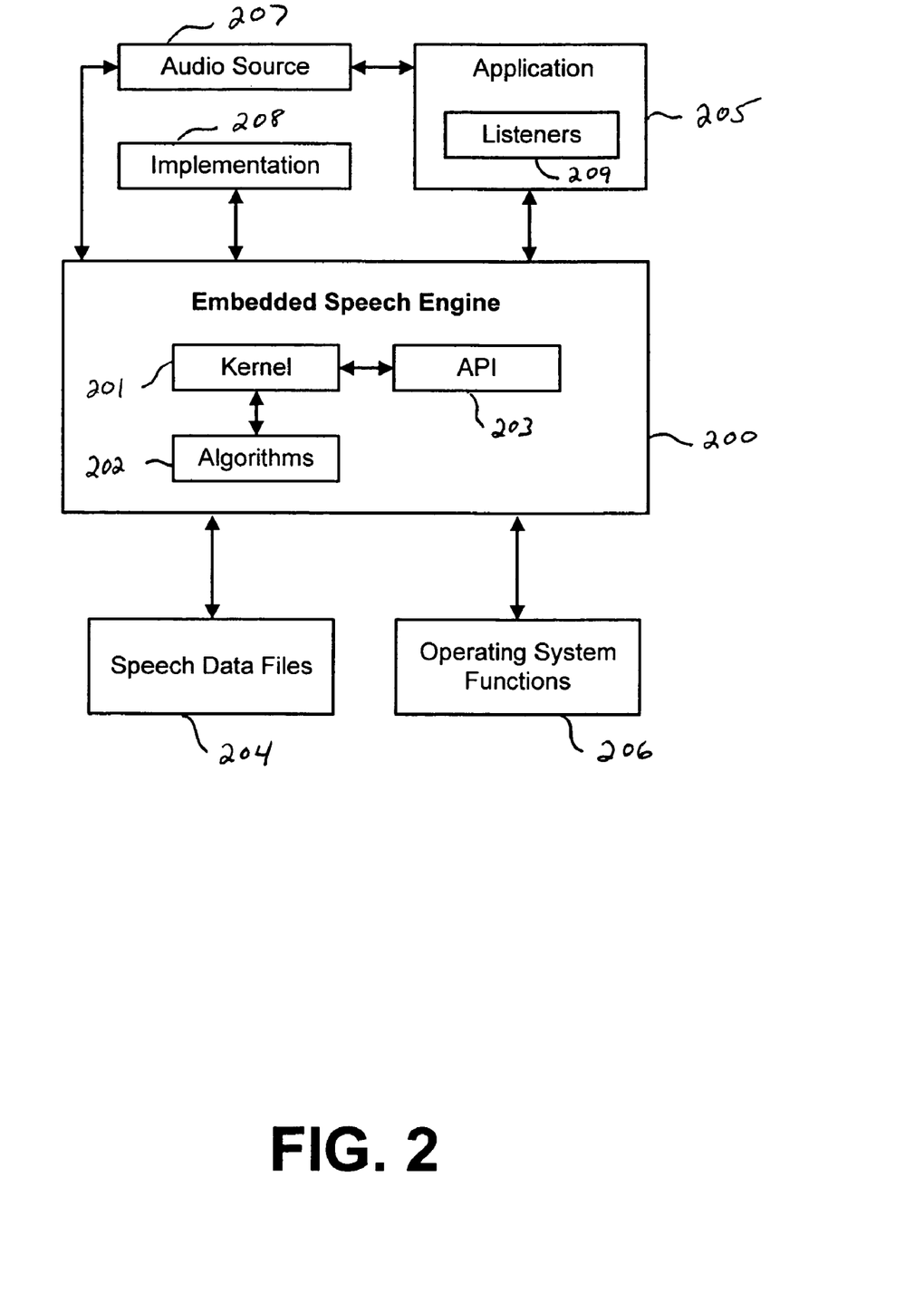
FIG. 2 is a diagram of a system/method for processing audio data using multiple speech technologies according to another embodiment of the present invention.

It is to be appreciated that the audio splitting process described above with respect the telephony system can be implemented with other platforms, for example, at the level of an embedded engine. Referring to FIG. 2, a block diagram illustrates an exemplary system architecture according to another embodiment of the present invention for splitting audio and processing the audio using multiple speech processing technologies using an embedded speech engine (ESE). The system comprises an embedded speech engine (ESE) 200 having a kernel 201 (core engine) that implements and executes one or more algorithms 202 (e.g., speech recognition, speaker identification algorithms) under the control of an API 203. The API 203 comprises a set of functions which enable the basic control of the kernel 201. The ESE 200 utilizes speech data files 204 (or conversational arguments) such as grammars, language models, vocabulary files, voiceprints, etc., for decoding speech data from audio source 207.

The ESE 200 executes on top of a local operating system (or platform) having corresponding operating system functions 206. An application 205 (e.g., an audio processing program) which is managed by, and utilizes the resources of, the operating system, communicates with the kernel 201 via the API 203 when particular speech services are needed by the application 205. It is assumed that the ESE 200 is optimized for support by the CPU of the machine, device, and/or platform in which the ESE 200 executes and is delivered to the CPU in compiled object form. The information need for implementing runtime data structures (which are dependent on the given computer platform architecture) are obtained from an implementation module 208.

For the exemplary embedded application, the ESE 200 is preferably written as highly portable C/C++ code independently on the operating system. More specifically, the architecture for the exemplary embodiment comprises a plurality of abstracted functions for communicating with the environment in which the ESE 200 executes (e.g., access to an audio subsystem, memory allocations, etc.) Such OS functions 206 are typically provided by the underlying OS or by the hardware implementation. As such, when the C/C++ code comprising the ESE 200 is ported to a given platform, only the abstraction layer needs to be ported and correctly linked to the services that are provided by the underlying OS and hardware.

An audio source 207 (i.e., an object (abstraction) that has the prescribed behavior) is controlled by the developer of audio hardware (e.g., soundcard). The ESE 200 comprises abstracted functions for communicating with the audio source 207 and drive the hardware. The developer of the audio source 207 provides the appropriate links (i.e., the actual audio objects) that allows the abstracted functions of the ESE 200 to drive the hardware and have the hardware provide the appropriate behavior.

The application 205 includes listeners 209 which are functions that receive calls from ESE 200. The listener functions 209 are typically called when the ESE 200 informs the application 205 about certain events. For example, when the ESE 200 recognizes a word, a "result" listener is called. The listeners 209 are part of the application 205 and may be readily added to the application 206.

Figure 3:
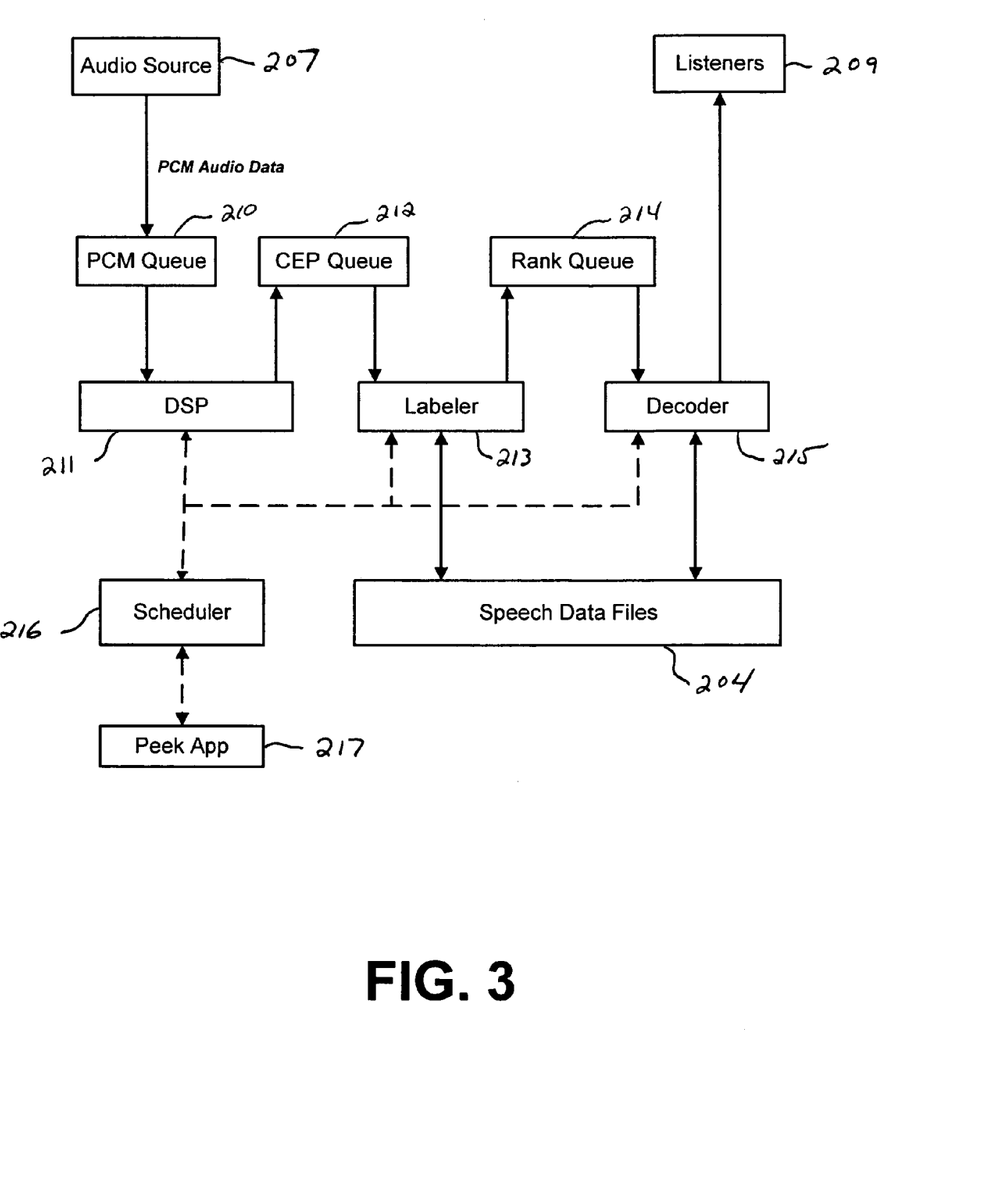
FIG. 3 is a diagram of an embedded speech recognition engine in accordance with a preferred embodiment of the present invention, that may be employed in the system of FIG. 2.

FIG. 3, illustrates a detailed architecture of the ESE 200 of FIG. 2 according to an exemplary embodiment of the present invention, which may be employed for providing audio splitting. The exemplary ESE 200 architecture comprises a PCM queue 210 which receives audio data from the audio source 207. The audio data is preferably pulse code modulated (PCM) audio data that is output from an analog-to-digital (A/D) converter included in the hardware associated with the audio source 207 (although it is to be understood that the audio data may be coded using other conventional techniques). The buffering of the audio data in the PCM queue 210 serves various purposes. For instance, the buffering of the audio data prevents data loss. The ESE 200 is preferably run on a CPU having suitable speed so to achieve a fast response time and realize small latency (e.g., a recognized command should be executed fast without considerable delay). The CPU may, nevertheless (especially at beginning of an utterance), execute slower than at the end of an utterance when the variance of choices is lower. To deal with latency and prevent data loss, the PCM queue 210 buffers the PCM audio data. In addition, as explained in detail below, such buffering allows the audio data to be utilized by other consumers (e.g., speech engines).

As illustrated in FIG. 3, there are additional queues located at different levels in the audio path. For instance, the exemplary ESE 200 of FIG. 3 comprises three main executive units: digital signal processor (DSP) 211, a labeler 213 and a decoder 215, all of which perform conventional functions. A CEP queue 212 is connected to the output of the DSP 211 and to the input of the labeler 213. The DSP 211 processes blocks of the buffered PCM audio data by performing, e.g., a cepstral analysis and generating a plurality of cepstral feature vectors representing the PCM audio data (such as MEL cepstra and/or LPC cepstra feature vectors). The feature vectors for each block of processed PCM audio data are stored in the CEP (cepstra) queue 212. The labeler 213 receives the feature vectors from CEP queue 212 and performs, e.g., a vector quantization process to determine the speech models (included in the speech data files 204) that are closest to the feature vectors (using any suitable conventional distance measure) and then ranks the feature vectors based on determined distances to the speech models. A rank queue 214 stores the rank information and corresponding feature vectors to await further processing by the speech decoder 215.

A scheduler 216 (or "supervisor" or "task dispatcher") performs functions such as assigning CPU time for the tasks of the different executive units during real-time operation based on the priorities designated to each of the executive units. To keep the buffers (e.g., queues) as small as possible, the data is preferably buffered in a place where the data bandwidth is the narrowest which, as shown in FIG. 3, is between the DSP 211 and the labeler 213. To achieve this, the DSP 211 should be ready for execution as soon as a new block of PCM audio data is received. Consequently, the DSP 211 is afforded the highest priority. In addition, each of the executing units must run on a particular platform faster than the longest allowed time for the A/D converter servicing. The PCM queue 210 should be large enough to store the PCM audio data between two consecutive calls of the audio source 207. The PCM audio data is then transferred from the PCM queue 210 when the DSP 211 is called. On the other hand, the labeler 213 and the decoder 215 are preferably given the same priority. When two or more units have the same priority, the scheduler 216 decides which unit will be run first based on the size of the data in queue (e.g., the task having more data pending in the queue for processing will be executed first). After execution, the executive units will return to the scheduler 216.

During the time between the switching of two executive units, a special function peek_app_idle( ) 217 is called. This function is a listener 209 function and is implemented by the application designer inside the application 205 (as explained with reference to FIG. 2). This function affords the application 205 the ability to, e.g., service the GUI every time an executive unit is switched. Generally, the peek_app_idle( ) 217 function should return to the scheduler 216 fast enough to provide its service between switching of two executive units. This function is especially useful for configurations running without support of a multitasking OS. With the support of multi-threaded or multitasking system, however, this function is not needed.

It is to be appreciated that by providing different queues at different levels in the audio path as illustrated in the exemplary ESE architecture of FIG. 3, audio splitting can be achieved at any level in the audio path by allowing multiple engines or executing units (referred to as consumers) to be connected to and obtain data from a given queue. That is, each of the internal queues can be employed to serve as a source of audio data for multiple consumers. This concept is illustrated by the block diagram of FIG. 4, wherein the CEP queue 212 is shown as servicing multiple speech engines (consumers) including not only the labeler 213 (as illustrated in FIG. 3), but also other executive units such as a speaker identifier 218, a speaker verifier 219 and a cepstrum listener 220. It is to be understood that the cepstrum listener 220 represents any other consumer of the cepstra in the CEP queue 212 such as another queue, a dictation engine, a compression engine, or a networked data stream to send the cepstra, e.g., in compressed format to a networked engine using the methods described in U.S. Pat. No. 6,009,387 to Ramaswamy, et al., issued Dec. 28, 1999, entitled "System and Method Of Compression/Decompressing a Speech Signal By Using Split Vector Quantization and Vector Quantization," and International Appl. No. PCT/US99/22925, filed Oct. 1, 1999, entitled "System and Method For Providing Network Coordinated Conversational Services", both of which are commonly assigned and incorporated herein by reference.

Figure 4:
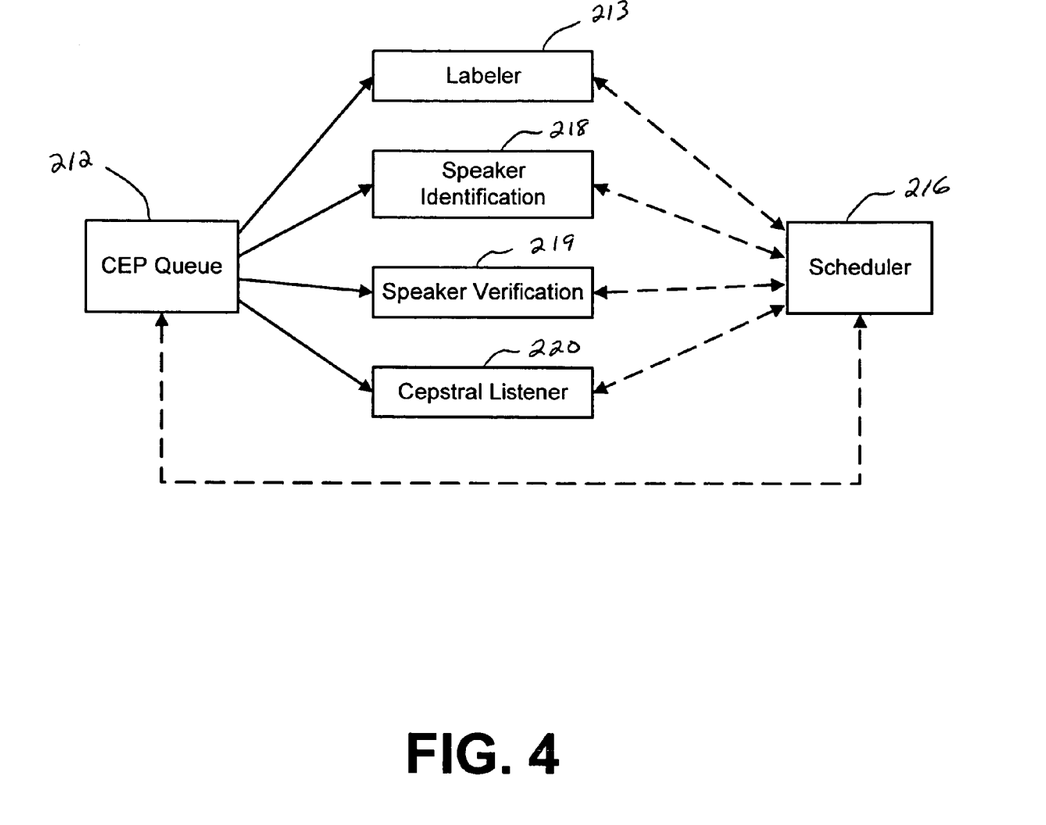
FIG. 4 is a diagram which illustrates a scheduling method in accordance with one aspect of the present invention, which may be implemented in the system of FIG. 3.

Each of the consumers will register their data requirements with the scheduler 216 and the scheduler 216 will assign a given consumer to one or more queues based on such requirements. For instance, as shown in FIG. 4, the labeler 213, speaker identifier 218 and speaker verifier 219, for example, are assigned to the CEP queue for processing the buffered cepstra. In one embodiment, the scheduler 216 will accord the same priority to each consumer assigned to a given queue and each consumer will inform the scheduler of the status of its consumption of data in the queue.

It is to be appreciated that the concept depicted in FIG. 4 may be further extended in the embedded architecture of FIG. 3 by connecting multiple consumers to the PCM queue 209 and/or the rank queue 214 to provide audio spitting at those stages in the audio path. For instance, audio spitting may occur at the level of the PCM input (output of the A/D converter of the audio subsystem) to support multiple ESEs obtaining data from the same PCM buffer. An audio splitting process may occur the output of the DSP 211, e.g., splitting the acoustic features (such as MEL cepstra) by connecting, for example, multiple labelers of different speech engines (different languages). Moreover, an audio splitting process may occur at the output of the labeler 213, e.g., splitting the identity of prototypes (e.g., Gaussians) that best match the features that are obtained, for example, via vector quantization (or possibly, hierarchically). In addition, the output of the decoder 215 may be buffered for supporting audio splitting to additional consumers.

Figure 5:
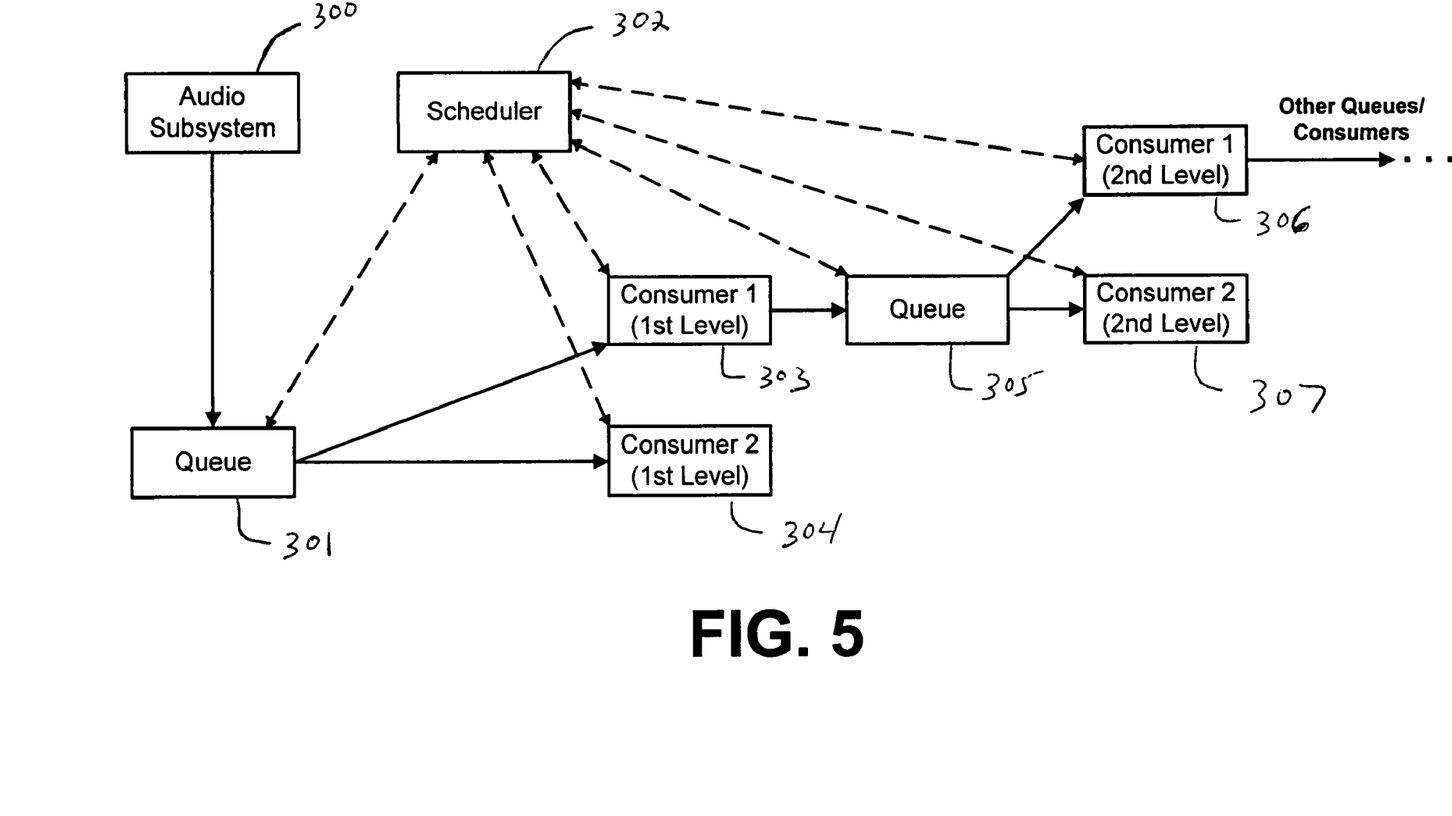
FIG. 5 is a diagram of a system/method for processing audio data using multiple speech technologies according to another embodiment of the present invention.

Referring now to FIG. 5, a block diagram illustrates a audio splitting system for supporting multiple speech technologies according to an embodiment of the present invention. In particular, FIG. 5 illustrates a general architecture for sharing audio data between multiple consumers, which may be employed in various platforms. The audio splitting system comprises an audio subsystem 300 and a queue 301 that receives audio data from the audio subsystem 300. On a first level, the audio splitting system includes a first consumer 303 and a second consumer 304 which share the audio data stored in queue 301. On a second level, a queue 305, connected to the output of consumer 303, services multiple consumers 306 and 307. On additional levels, the consumer 306 may be attached to one or more queues which service other consumers.

It is be appreciated by those skilled in the art that the system of FIG. 5 may readily be modified to provide various levels and hierarchical configurations of consumers and queues depending on the intended application. For example, using the above embedded example, queue 301 may be a PCM queue, the first consumer 303 may be a DSP that processes the audio data in queue 301 to generate Mel cepstra feature vectors that are stored in queue 305 and the second consumer 304 may be another DSP that processes the audio data in queue 301 to generate LPC cepstra feature vectors (which may also be stored in a queue depending on the application). In addition, the queue 305 (having the MEL cepstra feature vectors) can service one or more labelers (e.g., consumers 306 and 307). In another example, different requirements in terms of the signal properties (sampling rate, bandwidth, file format) may justify an audio split after the partial capture of the PCM data in queue 301. In particular, the PCM audio data may be captured at 22 kHz and split at the output of queue 301 for servicing consumer 304 which is an acoustic front-end working at 22 kHz sampling rate to extract cepstral feature, as well as servicing consumer 303 which is a down-sampling stage for other engines working at 11 or 8 kHz data. The output of this down-sampler (consumer 303) may be stored in queue 305 and split between different consumers 306 and 307.

The audio splitting system of FIG. 5, further comprises a scheduler 302 (or supervisor) which is responsible for load management/system management. The scheduler may be implemented using conventional system managers known in the art that are suitable for the given application such as the system management solutions offered the commercially available "Tivoli" (an application that provides load balance management for distributed systems). As generally described above, the scheduler 302 monitors the flow of data consumption and storage in the queues 301 and 305 and provides registration and prioritization services for each of the consumers (303, 304, 306, 307) in the system. In addition, for distributed systems, the scheduler 302 will monitor the network delay/traffic when scheduling and managing the different queues and consumer processes so as to ensure, for example, efficient flow of network data to various consumers that are network-connected to a given queue.

More specifically, each consumer (e.g., engine) will register information such as the source that it consumes and the characteristics of the features that it consumes (e.g., what type of feature vector, etc.) Each source type is deemed a queue that is consumed by the registered consumers. The scheduler 302 monitors the consumption of such queues and changes the priorities of the tasks to ensure appropriate consumption of the queues. It is to be further appreciated that during the registration process, a given consumer may also register a priority request as a function of the state of the dialog or importance of the function. Such priorities are typically selected by the application developer or by the operating system.

The scheduler 302 manages the entire process chain by managing the CPU time and resources between different consumers of the different queues. For example, the scheduler 302 either favors or slows the engines to balance the different queues. The priority afforded to a given consumer (e.g., queue) which is a source for other consumers is influenced by both the state of the consumption of the queue and by the state of consumption of the queues that it feeds.

Figure 6:
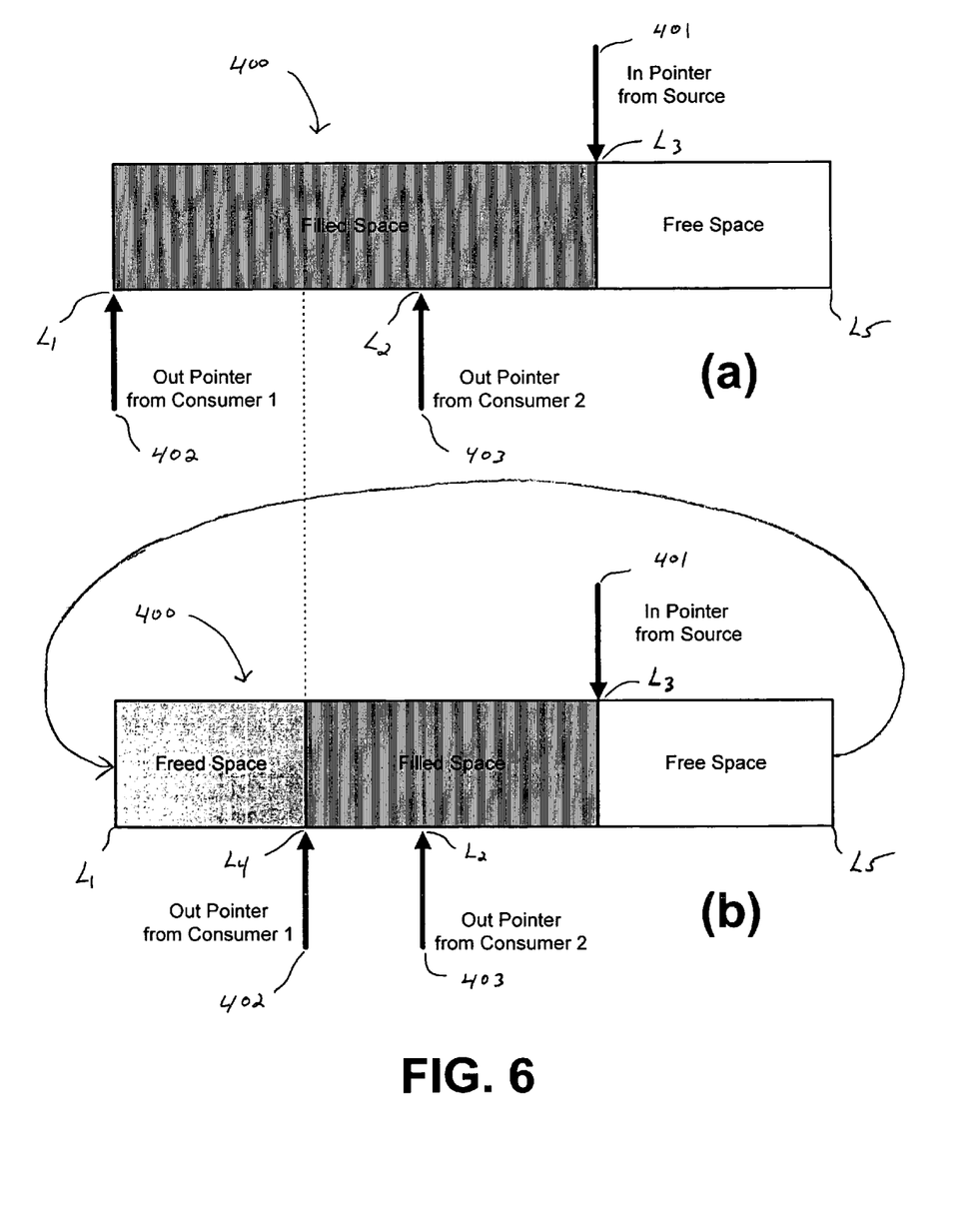
FIG. 6 is a diagram illustrating a method for managing a queue according to one aspect of the present invention.

Referring now to FIG. 6, a diagram illustrates a method for managing a queue according to one aspect of the present invention. For each queue in the system depicted in FIG. 5, for example, the scheduler 302 maintains a list of pointers pointing to data in and data out of the queue. In particular, as shown in FIG. 6a, for queue 400 (which comprises an allocated block of memory extending from a beginning memory location L1 to an ending memory location L5), the scheduler 302 maintains an IN pointer 401 that points to the next available memory location of the queue for storing speech data that is input from the source which feeds the queue 400. In addition, for each registered consumer of the queue 400, the scheduler 302 maintains an OUT pointer, e.g., OUT pointer 402 for consumer 1 and OUT pointer 403 for consumer 2. Each OUT pointer 402 and 403 points to the memory location having the next speech data to be consumed by the corresponding consumer.

As illustrated in FIG. 6a, the state of the queue is such that speech data input from the source fills memory location L1 through L3. It is to be understood that the "filled space" block of the queue represents the speech data that is shared (or split) between the multiple consumers (e.g., consumer 1 and consumer 2). Furthermore, the OUT pointer 403 points to memory location L2 (indicating that consumer 2 has consumed the shared speech data in memory locations L1 through L2) and the OUT pointer 402 points to location L1 (indicating that consumer 1 has not consumed any of the shared speech data). When speech data is written to or read from the queue 400, the scheduler 302 will check the OUT pointers of each consumer and the IN pointer from the source to determine how much space is available for incoming data and now much data has not yet been processed. For instance, in FIG. 6b, the state of the queue 400 is similar to the state of the queue 400 of FIG. 6a except that, as illustrated in FIG. 6b, consumer 1 has consumed the shared speech data in memory locations L1 through L4. Since, at this state both registered consumers have consumed the speech data in memory locations L1 through L4, this space is "freed" to accept new input speech data from the source. The exemplary queue 400 of FIG. 6 operates as a circular buffer. Accordingly, the scheduler 302 can determine the amount of available memory in the queue for writing data based on the IN pointer 401 and the last OUT pointer (which is OUT pointer 402 in the illustrative embodiment).

The scheduler 302 controls the data consumption in a manner so as to prevent the queue 400 from overflowing. As indicated above, assuming that registered consumer 1 and registered consumer 2 of queue 400 have the same priority, the scheduler 302 will grant priority to consumer 1 in FIG. 6 since it has more unread data in queue 400 than consumer 2. Indeed, by prioritizing consumer 1, more memory in the queue 400 can be made available (i.e., the "freed space" block increases). The queue 400 is emptied when all the consumers have read the data in the queue.

The scheduler 302 manages queue consumption by prioritizing and slowing down the different consumers to balance the queue consumption and avoid queue overflow. For instance, in a multiple port system, for example the scheduler 302 may reduce or increase the amount of engines instantiated per machine to balance the consumption of the queues (i.e. favoring the slowest consumers and slowing down the fast consumer and the producers earlier in the chain). This can also be done artificially (although much less efficient) by slowing down the network traffic towards the fast consumers. Furthermore, in a load balancing/system management topology, the slower consumers can simply receive more CPU, clock cycles similarly to the approach followed for the embedded engine embodiment discussed above. In addition, the scheduler can manage queue consumption in the distributed topology by monitoring the network traffic to determine any possible delays in data flow between, e.g., a given consumer and its registered consumers that are remotely located on another machine or device.

When a given queue threatens to overflow, different mechanisms may be applied. For instance, multiple queues may be instantiated when a queue is almost full to store the additional input data and allow all consumers to obtain the necessary data before the data is released. Alternatively, based on the requirements of the consumers, the scheduler 302 may simply allow the data that was not collected by all the consumers to be lost after a given time period. In addition, when the priority of all the consumers in the entire system are properly set, the system designer can make the queue having the smallest bit rate the largest buffer. This buffer can then readily store its data when the system lags behind in real-time operation.

It is to be appreciated that by using the same software and/or hardware implementation throughout the system for implementing the buffers, the scheduler 302 and each registered consumer in the audio splitting system of FIG. 5 may be "re-programmed" by one of its consumers further down the chain. This allows a new conversational engine or function to be dynamically loaded in the existing audio management architecture. For example, assume that a given consumer needs to consume another type of acoustic feature. A new DSP process may be programmed to consume the PCM input and generate the new acoustic feature type, which is then provided to the consumer. In another example, a DSP may be re-programmed to switch from producing one type of feature (e.g., for a speech recognition engine) to producing another type of acoustic feature (e.g., for another speech recognition task or for a particular speaker recognition engine, etc.) A "customization routine" to perform such programming can be loaded, for example, via an applet or an ActiveX component (or whatever other acceptable programming method is supported by the platform).

It is to be further appreciated that as indicated above, the system of FIG. 5 may be implemented as a networked architecture wherein certain consumers are network-connected to other groups of consumers on remote systems/platforms. In such case the scheduler 302 will distribute local priorities to each distributed system and monitor the network delay/traffic so as to maintain appropriate flow of data to each consumer. The transmission of audio data in compressed format between each of the distributed systems/consumers may be implemented using the compression and communication techniques disclosed in the above-incorporated U.S. Pat. No. 6,009,387 and International Appl. No. PCT/US99/22925.

It is to be understood that the present invention may be extended to platforms or systems other than the illustrative platforms/systems described herein. Such platforms/systems may include for instance, speech recognition systems, speaker recognition systems, utterance verification systems, speech biometric systems, natural language understanding systems, mood recognition systems, data segmentation systems (e.g., segmentation bases on speaker changes, environmental changes, etc.), data storage systems, data compression systems and communication systems for distribution of speech to networked distributed applications.

One platform in which the implementation of the audio splitting system of FIG. 5 is particularly useful is for providing management of a PC audio subsystem. Indeed, with conventional audio hardware implementation or key OS implementation, access to the audio stream is typically performed by using reserved memory blocks (e.g. 4 blocks of 4K of memory) that are sequentially emptied by any engine that is operatively connected to the audio stream. In accordance with the present invention, a PCM queue may be employed at the output of the A/D converter of a PC audio system (e.g., soundcard) rather than allocating fixed memory buffers (e.g., the 4 buffers) as is done conventionally. In this manner, the scheduler can manage the consumption of the output PCM queue as well as the writing data to the queue by changing the priorities of the source engines outputting data to the queue and the consuming engines. In addition, the only memory that needs to be allocated in accordance with the present invention is the memory that is needed to maintain the queue data at any given moment (as opposed to allocating the 4 buffers).

Another advantage of the present invention is that the hardware as well as the software, at each point of the chain (e.g., the DSP/labeler/decoder) or for any engine or technology utilizes the same architecture. As such, many processes at each stage can be operated in parallel.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system for sharing data between multiple consumers, comprising:
   a first queue for storing data;
   a data source for outputting the data that is stored in the first queue;
   a plurality of consumers each sharing the data stored in the first queue; and
   a scheduler for managing the storage and consumption of the data in the first queue and for controlling the data source and the plurality of consumers to control the amount of data stored in and consumed from the first queue,
   wherein the data source comprises a consumer that consumes data stored in a second queue that is controlled by the scheduler.

2. A system for sharing data between multiple consumers, comprising
   a first queue for storing data;
   a data source for outputting the data that is stored in the first queue;
   a plurality of consumers each sharing the data stored in the first queue; and
   a scheduler for managing the storage and consumption of the data in the first queue and for controlling the data source and the plurality of consumers to control the amount of data stored in and consumed from the first queue,
   wherein the scheduler prioritizes data consumption of the first queue based on an amount of unread data of each of the plurality of consumers.

3. A method for sharing data between multiple consumers, comprising the steps of:
   storing data received from a data source in a first queue;
   sharing the data in the first queue between a plurality of consumers; and
   managing the storage and consumption of the data in the first queue, wherein managing comprises controlling the data source and the plurality of consumers to control the amount of data stored in and consumed from the first queue,
   wherein the step of sharing comprises the steps of:
   registering data requirements of each of the plurality of consumers; and
   assigning the plurality of consumers to the first queue based on the registered data requirements; and
   further comprising the step of prioritizing data consumption of the first queue based on an amount of unread data in the first queue of each of the plurality of consumers.

4. A program storage device readable by a machine, tangibly embodying a program of instructions executable by the machine to perform method steps for sharing data between multiple consumers, the method comprising the steps of:
   storing data received from a data source in a first queue;
   sharing the data in the first queue between a plurality of consumers; and
   managing the storage and consumption of the data in the first queue, wherein managing comprises controlling the data source and the plurality of consumers to control the amount of data stored in and consumed from the first queue, wherein the instructions for performing the step of sharing comprise instructions for registering data requirements of each of the plurality of consumers; and assigning the plurality of consumers to the first queue based on the registered data requirements; and further comprising instructions for performing the step of prioritizing data consumption of the first queue based on an amount of unread data of each of the plurality of consumers.

* * * * *